US006555932B1

(12) United States Patent
Albrecht

(10) Patent No.: US 6,555,932 B1
(45) Date of Patent: Apr. 29, 2003

(54) CUT-OFF CIRCUIT FOR SENSING APPARATUS

(76) Inventor: Frank A. Albrecht, 108 W. Park St., Poplar Grove, IL (US) 61065

( * ) Notice: Subject to any disclaimer, the term of this patent is extended or adjusted under 35 U.S.C. 154(b) by 232 days.

(21) Appl. No.: 09/606,283

(22) Filed: Jun. 29, 2000

(51) Int. Cl.[7] .................................................. B60L 1/00
(52) U.S. Cl. ............................................ 307/9.1; 172/6
(58) Field of Search ........................... 307/9.1; 172/4.5, 172/10, 2, 6, 38, 75

(56) References Cited

U.S. PATENT DOCUMENTS 3,757,868 A * 9/1973 Gregerson .................. 172/239
3,776,316 A * 12/1973 Eberhart ........................ 172/6
4,279,138 A * 7/1981 Van Der Lely et al. ........ 172/4
4,376,473 A * 3/1983 Tomasek et al. ........... 192/3.58
4,495,577 A * 1/1985 Strunk et al. .................. 172/7
4,518,044 A * 5/1985 Wiegardt et al. .............. 172/3
4,846,283 A * 7/1989 Batcheller .................... 172/10
5,031,705 A * 7/1991 Clemens ........................ 172/6
5,454,432 A * 10/1995 Le Clezio ...................... 172/3
5,549,166 A * 8/1996 Orbach et al. ................. 172/3
5,558,163 A 9/1996 Hollstein ....................... 172/2
5,810,095 A * 9/1998 Orbach et al. ................. 172/2
5,878,679 A 3/1999 Gregor et al. ............. 111/17.1
6,009,354 A * 12/1999 Flamme et al. .............. 172/4.5
6,079,340 A * 6/2000 Flamme et al. ............. 111/178
6,131,062 A * 10/2000 Nielsen ......................... 172/2
6,141,612 A * 10/2000 Flamme et al. ............. 111/177
6,195,604 B1 * 2/2001 Moore et al. .......... 342/357.09

* cited by examiner

*Primary Examiner*—Brian Sircus
*Assistant Examiner*—Sharon A. Polk
(74) *Attorney, Agent, or Firm*—Leydig, Voit & Mayer, Ltd.

(57) ABSTRACT

An electronic circuit for a utility vehicle having a sensing apparatus for detecting data regarding the vehicle and a control for operating implements used in conjunction with the vehicle. The electronic circuit is operatively coupled to the sensing apparatus to provide more accurate data regarding use of the vehicle. The electronic circuit operates in two modes including: a first mode allowing the sensing apparatus to operate, and a second mode not allowing the sensing apparatus to operate. Typically, the electronic circuit is operatively coupled between a power source of the utility vehicle and the sensing apparatus for regulating the supply of power therebetween by operating in the two modes. Preferably, the electronic circuit is operatively linked to a control that operates implements used in conjunction with the vehicle. Thus, when the operator uses the control to operate an implement, the sensing apparatus is automatically regulated to provide more accurate data regarding the actual use of the utility vehicle.

22 Claims, 5 Drawing Sheets

CUT-OFF CIRCUIT FOR SENSING APPARATUS

FIELD OF THE INVENTION

The present invention relates generally to monitoring systems and sensing apparatus for utility vehicles, and more particularly to control circuitry for sensing systems and sensing apparatus used in utility vehicles, e.g. farm machinery and tractors.

BACKGROUND OF THE INVENTION

Many modern utility vehicles, and particularly farm tractors, utilize various monitoring systems or sensing apparatus to monitor the activities of the vehicle. For example, common sensing apparatus monitors the distance the tractor has traveled and the time the tractor has been operated. In addition to detecting and displaying this data, the data can be inputted to computer systems, either alone or in combination, to determine further important characteristics regarding the operation of the vehicle and its operator. For example, by monitoring the distance a tractor has traveled, the computer system can determine the amount acreage covered. Furthermore, by using this data in conjunction with the amount of time the tractor has been operated the computer system can determine the efficiency of the operator's use of the tractor.

Unfortunately, the sensing apparatus and their computational counterparts provide information which does not accurately reflect the effective use of the vehicle. For example, the distance the tractor has traveled over the course of its operation does not directly translate into the amount of farming acres covered by the tractor. The distance traveled while turning the tractor around, backing up, moving from one row to another, from field to field, or even merely traveling from the storage facility to the particular field to be farmed, are distances detected and computed that were not spent working a field. The same principle holds true for the time sensor, and the various other sensors commonly employed. It can therefore be seen that the current system results in an inaccurate portrayal of computed values such as the number of acres covered and hours spent doing so.

SUMMARY OF THE INVENTION

In light of the above, a general object of the present invention is to provide a utility vehicle having sensing apparatus that produces more accurate data regarding the use of the vehicle.

In that regard, it is also an object of the present invention to accomplish the above objective with little or no additional effort required from the vehicle operator.

It is related object of the present invention to produce more accurate data regarding the effective use of a utility vehicle in a simple and economical manner.

In accordance with these objects, the present invention provides an electronic circuit for a utility vehicle having a sensing apparatus for detecting data regarding the vehicle and a control for operating implements used in conjunction with the vehicle. The electronic circuit is operatively coupled to the sensing apparatus to provide more accurate data regarding effective use of the vehicle.

It is a feature of the present invention that the electronic circuit operates in two modes including: a first mode allowing operation of the sensing apparatus, and a second mode disabling operation of the sensing apparatus.

It is another feature of the present invention to operatively couple the electronic circuit between a power source of the utility vehicle and the sensing apparatus to regulate the supply of power therebetween. In the first mode, the electronic circuit allows power flow to the sensing apparatus. In the second mode, the electronic circuit denies power flow to the sensing apparatus.

It is a further feature of the present invention to operatively link the electronic circuit to a control that operates implements used in conjunction with the vehicle. Thus, when the operator uses the control to operate an implement, the sensing apparatus is automatically regulated to provide more accurate data regarding the actual use of the utility vehicle. Further, the operator need not expend any additional effort for the sensing apparatus to provide more accurate data.

It is yet another feature of the present invention that the electronic circuit operates in either the first or second mode based upon the implement being in either an active position or an inactive position. This feature may be accomplished either through the operative coupling of the electronic circuit to the implement control, or through operative coupling of the electronic circuit to a remote sensing apparatus that detects the implement being in the active and inactive positions, such as a position sensor.

These and other object and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Utility vehicles such as farm tractors, utilize various sensing apparatus to monitor the activities of the vehicle that can be used to compute important information regarding the vehicle and its use. For example, various implements such as a rake, disc plow, sprayer, barrow, planter, or cultivator, etc. may be used with a tractor to work a field or its crop. The sensing apparatus records data that can be used, among other things, to calculate the acreage worked on by the implement, i.e. the amount of the crop cultivated, plowed, sprayed, or the like. It is also common for most modern utility vehicles to employ a hydraulically operated hitch, such as a three-point hitch, to attach and operate these various farm implements.

Figure 5:
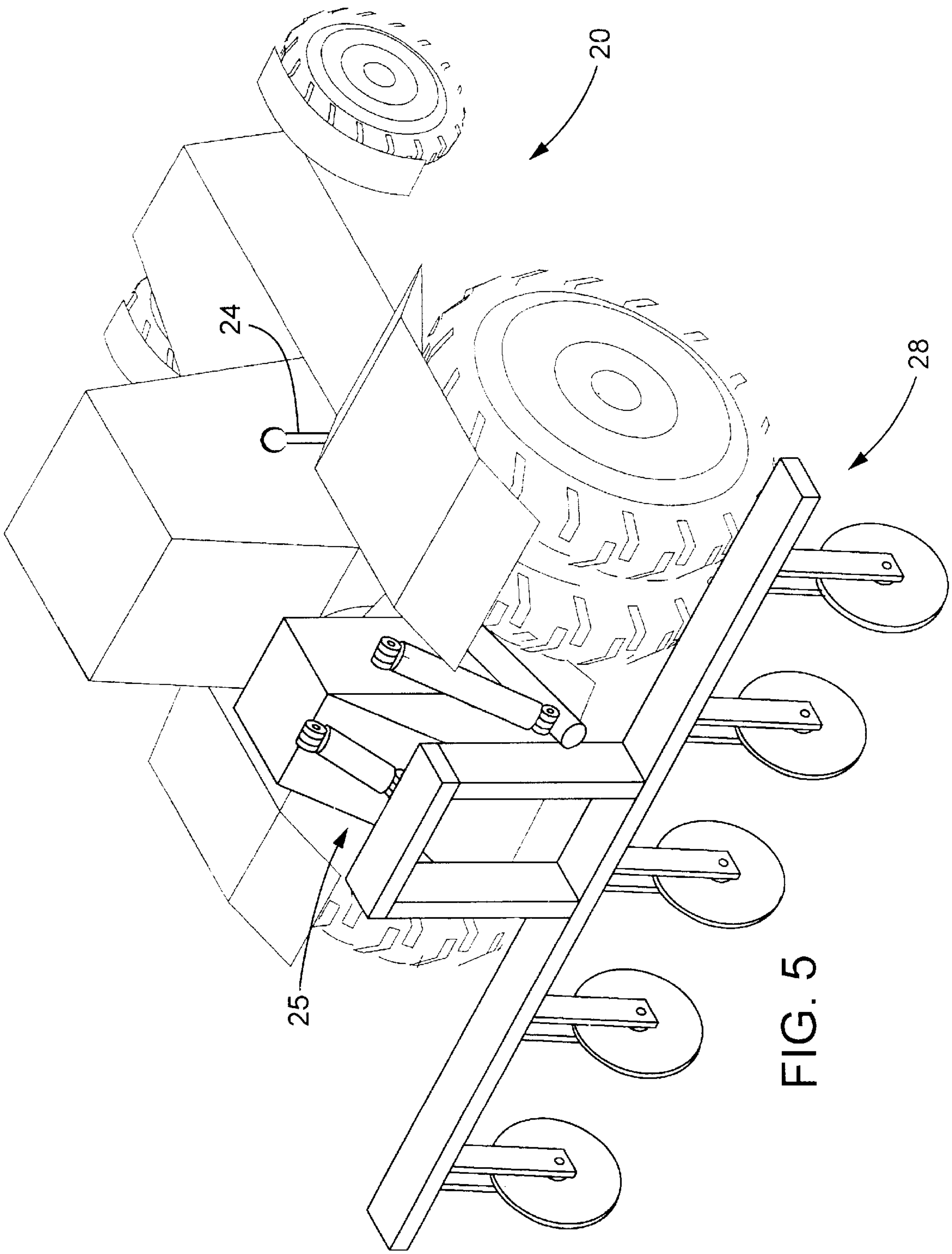
FIG. 5 illustrates a tractor with which the present invention may be employed.

As shown in FIG. 5, an implement 28 is coupled to a tractor 20 via a basic three-point hitch 25. At least one implement control 24, shown as a lever 24 in the figure, in the cabin of the tractor 20 hydraulically actuates the hitch 25 in the rear of the tractor 20. As will be readily understood by those having skill in the art, the implement control may comprise push buttons, or other electronic or hydraulic controls. As will also be understood, the hitch 25 is used to position the implement 28 between active and inactive positions. In the preferred embodiment shown, the control lever 24 moves the implement 28 upwards or downwards between active and inactive positions. Additional levers may also be found in the cabin of the tractor to control other aspects of the attached farm implements, such as rotating, pivoting, pumping fluid, etc., as determined by the particular implement and hitch used.

When the tractor 20 is moving it is not always desirable for the sensing apparatus to be detecting and processing data. For example, traveling to and from the field to be worked, or between various fields, does not require the farm implement to be engaged with the ground or to be operating. Thus, by using the implement control 24 to hydraulically actuate the hitch, the operator can raise or lower the respective farm implement, and may use other levers to control other operable features of the farm implement. Essentially, when lowered the farm implement is in an active position, and when raised is in an inactive position.

It is thus an aspect of the present invention to operatively couple an electronic circuit to the sensing apparatus which controls the apparatus based upon the implement being in the active or inactive position. Notably, the circuit does not allow the sensing apparatus to operate when the implement is inactive, and thus the sensing apparatus does not receive or process data regarding the tractor. Therefore, referring again to the above example, the sensing apparatus does not detect distance data when the implement is inactive, i.e. when traveling to the field, between fields, turning around or the like. This results in a more accurate computation of the acreage cultivated, plowed or generally worked as the case may be.

Figure 1:
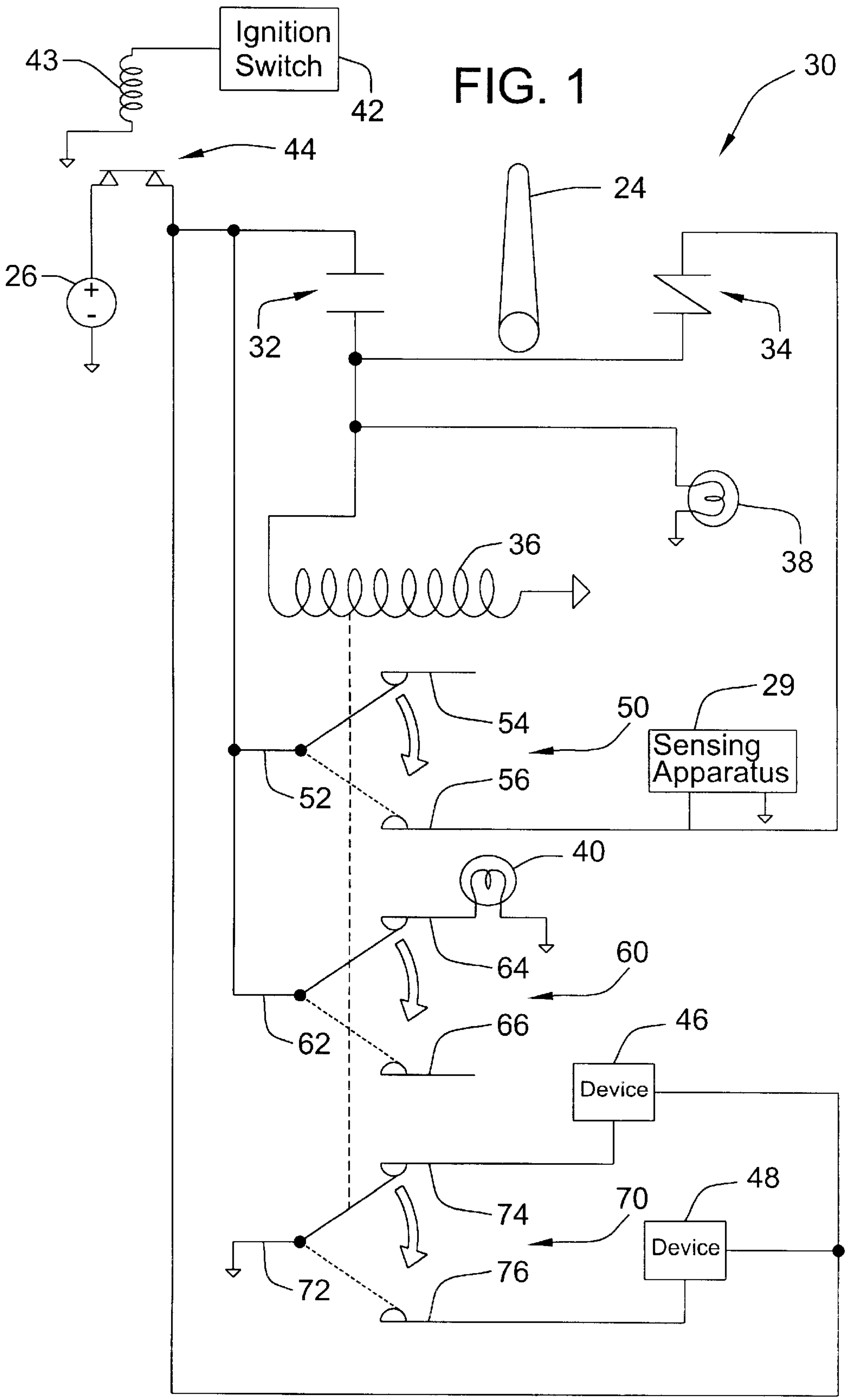
FIG. 1 is a schematic diagram of an embodiment of the electronic circuit constructed in accordance with the teachings of the present invention.

Turning to FIG. 1, a diagram of an embodiment of the electronic circuit 30 is depicted. The circuit 30 is operatively coupled to the tractor's power supply 26, although the circuit 30 may be independently supplied with power specifically for use with the present invention. To control the supply of power to the circuit 30, it may be desirable to dispose a switch 44 between the power supply 26 and the remainder of the circuit 30 to control the power therethrough. Switch 44 is regulated by coil 43 which is connected to and regulated by the ignition switch 42. Thus, when the vehicle is turned on, as controlled by the ignition switch 42, coil 43 is energized and closes switch 44 to supply the circuit 30 with power. FIGS. 1–4 illustrate the switch 44 in this condition. Likewise, the circuit 30 is powered down when the ignition switch 42 is off, which de-energizes coil 43 and opens switch 44. The electronic circuit 30 is responsive to the tractor's implement control 24 which has been shown as a lever 24 for operating one of the various implements 28 (see FIG. 5) connected via a hitch 25 and used in conjunction with the utility vehicle or tractor 20. The control lever 24 is operable between a positive position (see FIG. 2) to lower or activate the hitch 25, and a negative position (see FIG. 4) to raise or deactivate the hitch 25, although the quiescent state for the control lever 24 is in the neutral position as shown in FIG. 1. That is, when the control 24 comprises a lever as in the present embodiment, the lever 24 is biased to the neutral position.

The circuit 30 is coupled to the sensing apparatus 29 to regulate the supply of power thereto, and thus the device's ability to detect and record data. A first sensing switch 32 detects the control 24 being in the positive position, while the second sensing switch 34 detects the control 24 being in the negative position. The first sensing switch 32 is normally open and the second sensing switch 34 is normally closed. These switches 32, 34 are individually transitioned to their opposite state when control 24 is in the positive and negative position, respectively, and then return to their normal state when control 24 returns to its neutral position. The first sensing switch 32 is coupled between to the second sensing switch 34 and the power supply 26. Sensing switches 32, 34 are coupled to a relay coil 36 and a green light 38 which are grounded. The relay coil 36 actuates switch 50, which is a single pole double throw (SPDT) switch. Switch 50 comprises terminals 52, 54, 56, wherein terminal 52 is coupled to the power supply 26 and connects to either terminal 54 or terminal 56 as determined by relay coil 36. Terminal 56 is coupled to the second sensing switch 34. When terminal 52 is connected to terminal 56, power is supplied to the sensing apparatus 29, which is not powered when terminal 52 is connected to terminal 54, to achieve the above-noted objects.

As illustrated in FIG. 1, an embodiment of the invention may utilize a double pole, double throw switch (DPDT). As such, another switch 60 is included. This switch 60 includes a terminal 62 coupled to the power supply 26. Terminal 62 connects to either terminal 64 or terminal 66 as determined by the relay coil 36. Terminal 64 is coupled to red light 40 which is grounded. Still further, an embodiment may utilize a triple pole, triple throw switch. In such a case, switch 70 is also controlled by relay coil 36, wherein terminal 72 communicates with either terminal 74 or terminal 76, terminal 72 being illustrated as grounded in this embodiment. Both terminal 74 and terminal 76 are coupled to any desired devices 46, 48 which may be run from power supply 26. It may also be desirable to separately run devices 46, 48 with their own separate power supplies. Thus, switch 70 determines which device 46, 48 is coupled to terminal 72 and grounded to complete the circuit and power the respective device 46 or 48.

FIG. 1 shows the electronic circuit 30 in its quiescent state, with sensing apparatus 29 being de-energized. The control 24 is in its neutral position, while sensing switch 32 is open, sensing switch 34 is closed, terminal 52 of switch 50 contacts terminal 54, terminal 62 of switch 60 contacts terminal 64, and terminal 72 of switch 70 contacts terminal 74. Thus, switches 50, 60, 70 are shown in their positions when coil 36 is de-energized. Since sensing switch 32 is open, current from power supply 26 flows through terminal 62 to terminal 64 which lights red light 40 indicating that sensing apparatus is de-energized. Since coil 36 is de-energized, device 46 is energized by virtue of the ground supplied by terminal 72 of switch 70 contacting terminal 74.

Figure 2:
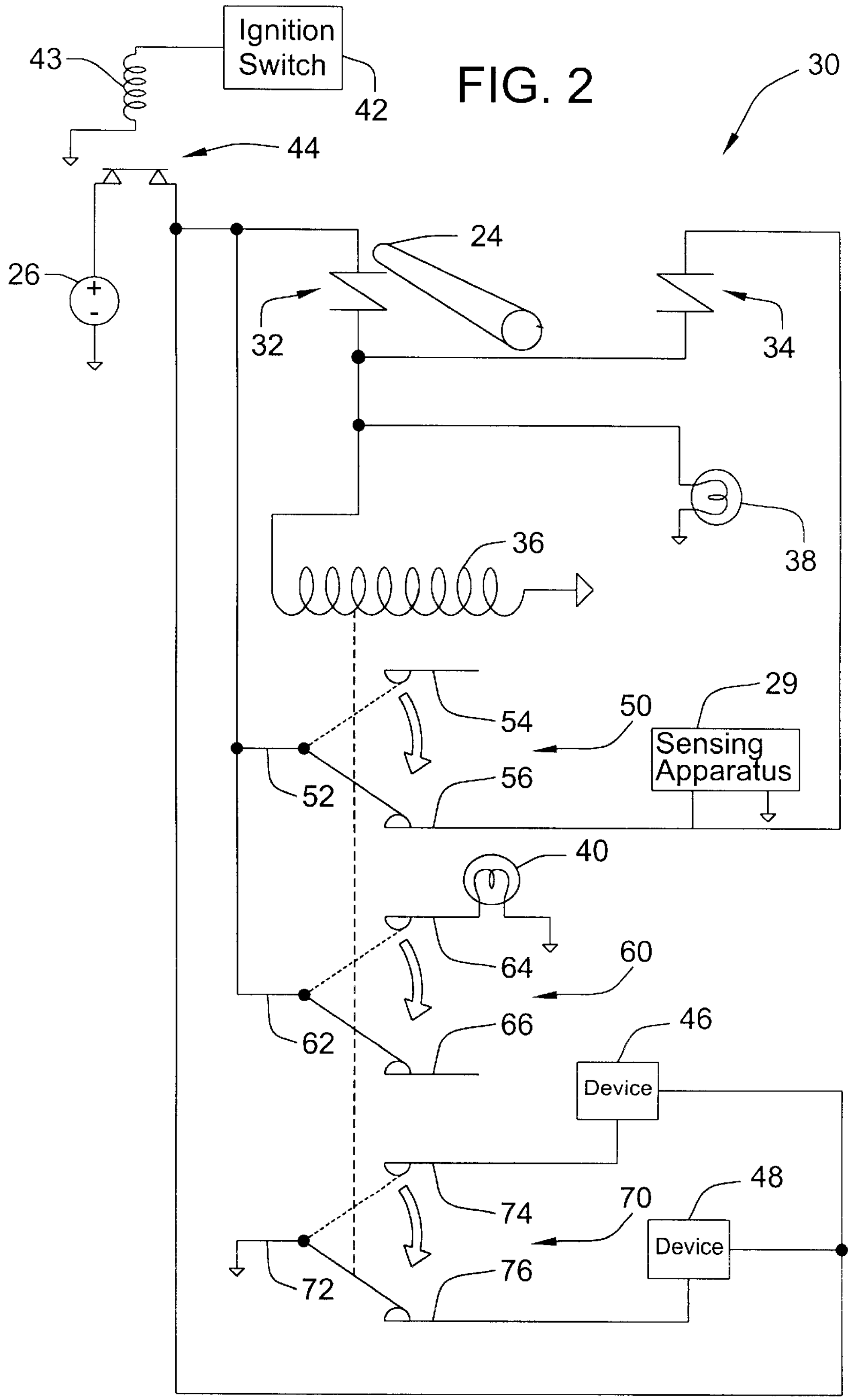
FIG. 2 shows the electronic circuit of FIG. 1 when the implement control is in a positive position.

FIG. 2 illustrates the circuit 30 when control 24 is held in the positive position, which relates to the implement 28 being activated or lowered, i.e. in an active position. When control 24 is held in this positive position, first sensing switch 32, which is normally open, detects this action and becomes closed. Accordingly, green light 38 and relay coil 36 are coupled to power supply 26, thereby lighting green light 38 and energizing coil 36. By energizing the relay coil 36, switches 50, 60, 70 are transitioned. More particularly, terminal 52 now contacts terminal 56, which completes the circuit for sensing apparatus 29. Switch 60 is thrown as terminal 62 contacts terminal 66 so that red light 40 no longer illuminates. At switch 70, terminal 72 is in communication with terminal 76 to power device 48. Notably, the sensing apparatus 29 is powered to detect data regarding the vehicle 20.

Figure 3:
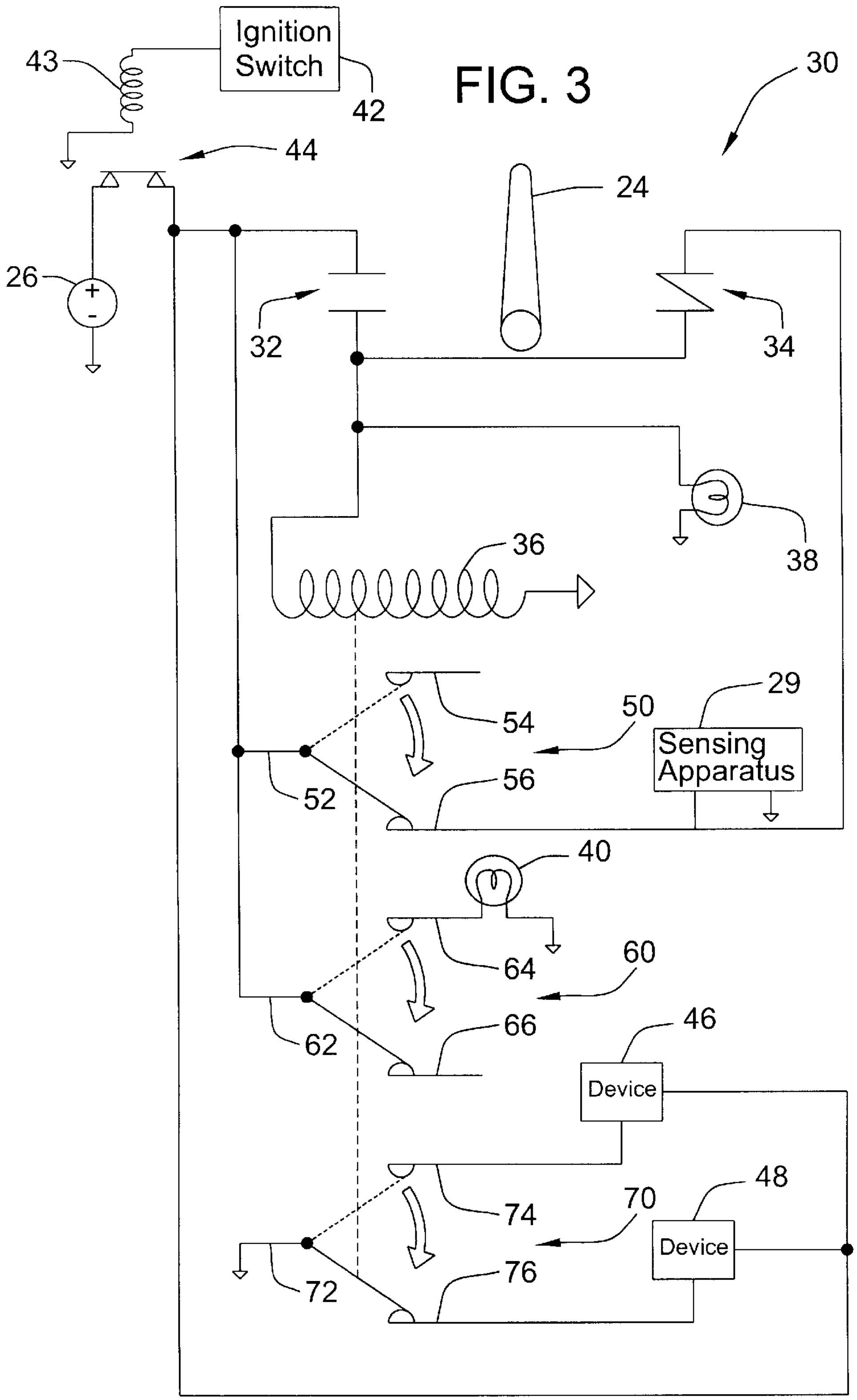
FIG. 3 illustrates the electronic circuit of FIG. 1 when the implement control is in the neutral position subsequent being in the positive position.

As the control 24 is released it returns to its neutral position as shown in FIG. 3. In response, sensing switch 32 returns to its normally open position. Nonetheless, terminal 52 is in communication with terminal 56, and since the second sensing switch 34 remains closed, the relay coil 36 remains energized. It will be recognized that sensing apparatus 29 is continually supplied with power so that it may detect data such as distance traveled or hours spent, etc.

Figure 4:
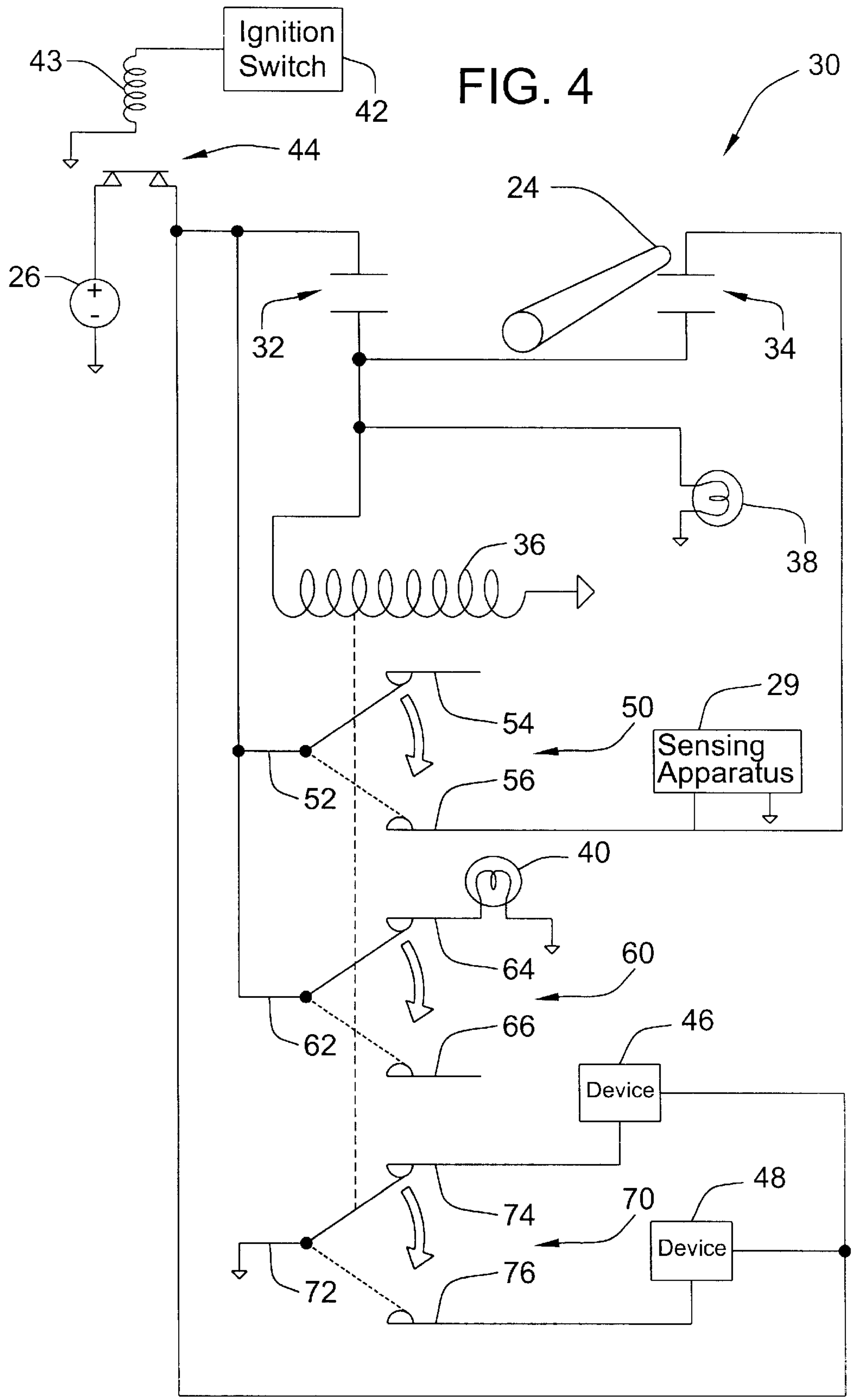
FIG. 4 illustrates the electronic circuit of FIG. 1 when the implement control is in the negative position.

FIG. 4 illustrates the circuit 30 when the control 24 is held in the negative position which deactivates or raises the hitch 25. In this case, the second sensing switch 34, which is normally closed, opens in response to the control 24. Accordingly, the relay coil 36 becomes de-energized allowing switches 50, 60, 70 to return to their natural positions. Terminal 52 of switch 50 contacts terminal 54 while terminal 62 of switch 60 contacts terminal 64 to energize red light 40, wherein terminal 72 of switch 70 contacts terminal 74 to power device 46. As terminal 52 no longer contacts terminal 56, no power is supplied to the sensing apparatus 29 and hence it can no longer detect information regarding the use of the utility vehicle 20. It will be recognized that when the control 24 is released it returns to its neutral position and the system returns to the state shown in FIG. 1.

While the foregoing description and the figures have described the sensing apparatus 29 as being coupled to the electronic circuit 30 downstream and adjacent to terminal 56 of switch 50, it will be readily recognized to those having skill in the art that this particular location is not necessary to employ the present invention. For example, the sensing apparatus 29 could be coupled to terminal 66 of switch 60, or any other terminal as desired. Likewise, sensing apparatus 29 could also be coupled to the circuit 30 adjacent relay coil 36 and light 38, either upstream or downstream thereof. Furthermore, while the foregoing description and figures have described a preferred embodiment of the electronic circuit 30, various other circuitry designs could likewise be employed to regulate the ability of the sensing apparatus 29 to detect and record data regarding the vehicle in accordance with the above teachings.

It is an aspect of the present invention that the ability of the sensing apparatus 29 to receive and detect data is regulated based upon the position or operation of a vehicle or farm implement. For example, while the preferred embodiment has detected information regarding the implement through the implement control or lever 24, a remote position or implement sensor may be connected to the tractor to detect the operation of an implement, i.e. whether the implement is active or inactive. The hitch 25 itself could be adapted to operate as a position sensor for the implement. Based on a signal from the position or implement sensor that transitions sensing switches 32, 34, the electronic circuit 30 can regulate the ability of a sensing apparatus to detect data regarding a utility vehicle.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A tractor having an electronic circuit adapted for use with an implement to be operatively coupled to the tractor, the tractor comprising:

a tractor body including a cabin having an implement control for regulating an implement;

a sensing apparatus for detecting data regarding the tractor; and said electronic circuit coupled to the sensing apparatus and operatively coupled to the implement control for switching between a first and second mode and operating in one of the two modes including:

a) the first mode allowing the sensing apparatus to operate; and b) the second mode disallowing the sensing apparatus to operate wherein the implement control has a positive position for activating the implement and a negative position for activating the implement, and wherein the electronic circuit operates in the first mode in response to the implement control being in the positive position and operates in the second mode in response to the implement control being in the negative position, the sensing apparatus coupled to detect only when the implement is altering or detecting an environment outside the tractor such that the electronic circuits operates in the second mode when the implement is not to alter or detect an environment outside the tractor.

2. A tractor as in claim 1, wherein the electronic circuit is operatively coupled between a power supply and the sensing apparatus, the electronic circuit allowing the sensing apparatus to receive power in the first mode, the circuit disallowing the sensing apparatus to receive power in the second mode according to whether the environment outside the tractor is to be altered.

3. A tractor according to claim 1, wherein the implement is operatively coupled to the tractor body by a hydraulically actuated hitch.

4. A tractor according to claim 3, wherein the implement control comprises a lever for hydraulically actuating the hitch.

5. A tractor according to claim 1, wherein the implement is operatively coupled to the tractor body by a hydraulically actuated hitch, and wherein the hitch is vertically adjustable between a high position and a low position, the high position corresponding with the implement being in an inactive position, the low position corresponding with the implement being in an active position.

6. An electronic circuit for a utility vehicle having a sensing apparatus for detecting data regarding the vehicle and a control for operating implements used in conjunction with the vehicle, the implements operable between active and inactive positions, the circuit comprising:

a first sensing switch responsive to the implements being positioned in the active position;

a second sensing switch responsive to the implements being positioned in the inactive position;

the first sensing switch permitting the sensing apparatus to operate when the implement is in the active position; and the second sensing switch not allowing the sensing apparatus to operate when the implement is in the inactive position, wherein the control determines whether the first sensing switch or the second sensing switch is active by being configured to detect whether an environment outside the vehicle is being sensed or altered such that the control operates the second sensing switch only when the implement is not to alter or detect an environment outside the utility vehicle.

7. An electronic circuit according to claim 6, wherein the first and second sensing switches are operatively coupled to the implement control for detecting the actuation of the implements into the active or inactive position.

8. An electronic control according to claim 7, wherein the implement control has a positive position for placing the implements in an active position, the implement control having a negative position for placing the implements in an inactive position, the first sensing switch detecting the implement control being in the positive position, the second sensing switch detecting the implement control being in the negative position.

9. An electronic circuit according to claim 8, the utility vehicle's implement control being a hydraulic lever, wherein the first sensing switch detects the lever being in the positive position, and the second sensing switch detects the lever being in the negative position.

10. The electronic circuit of claim 6, wherein the first sensing switch is normally open, and the second sensing switch is normally closed, the first and second sensing switches being connected to a relay coil for activating a relay switch connected to a power supply.

11. The electronic circuit of claim 10, wherein the relay switch is a single pole, single throw switch.

12. The electronic circuit of claim 10, wherein the relay switch is a double pole, double throw switch.

13. The electronic circuit of claim 10, wherein the relay switch is a triple pole, triple throw switch.

14. The electronic circuit of claim 10, wherein a green light is connected to the first and second sensing switches.

15. The electronic circuit of claim 10, wherein the sensing apparatus is connected to the circuit downstream of the relay switch such that the relay switch controls the supply of power to the sensing apparatus.

16. A circuit comprising:

at least one switch operably coupled to a sensing apparatus and at least two devices, the sensing apparatus related to working a field;

a control coupled to the at least one switch and the sensing apparatus, the control positioning a farm implement and switching the at least one switch, the control biased to a neutral position, the sensing apparatus is operable only when the control positions the implement in a working position such that the at least one switch completes a circuit making the sensing apparatus operable when the control is in one of an active position and the neutral position following the active position, the sensing apparatus configured to detect when the farm implement is working the field such that the environment of the field is to be altered, and the switch is open when the control is in one of an inactive position and the neutral position following the inactive position.

17. The circuit of claim 16 wherein the circuit further comprises an indicator light and a device.

18. The circuit of claim 16 further comprising:

a remote position sensor coupled to the control, the remote position sensor providing the position of the farm implement, the control responding to the position by appropriately switching the at least one switch to operate the sensing apparatus only when the farm implement is operable to alter the environment outside a utility vehicle.

19. A method for switching a sensing apparatus the sensing apparatus disposed in a utility vehicle, the utility vehicle adapted for use with an implement operatively coupled to the utility vehicle, the method comprising:

sensing data concerning use of the utility vehicle;

detecting a change in position of the implement coupled to the utility vehicle; and automatically altering the sensing in response to the change in position only when the change in position directly affects whether or not the environment outside the utility vehicle is to be altered due to the change in position of the implement.

20. The method of claim 19 wherein detecting the change in position is via one or more of a remote position sensor, a control coupled to the sensing apparatus and the implement, a switch coupled to the sensing apparatus, and a lever controlling the implement.

21. The method of claim 20 further comprising automatically altering operation of one or more devices via the control in response to the change in position.

22. The method of claim 19 wherein the sensing apparatus detects one or more of a distance traveled by the utility vehicle, a time spent plowing, cultivating, operating an implement, an amount of crop cultivated, an amount of crop sprayed, and an amount of alterations to a field.

* * * * *